US00RE44901E

(19) United States
(12) Reissued Patent
Becker et al.

(10) Patent Number: US RE44,901 E
(45) Date of Reissued Patent: May 20, 2014

(54) METHOD FOR CONVERTING DIRECT VOLTAGE INTO THREE PHASE ALTERNATING VOLTAGE

(75) Inventors: Holger Becker, Elmshorn (DE); Guenther Cramer, Kassel (DE); Sven Bremicker, Alheim (DE); Thorsten Dingel, Niestetal (DE); Bernd Engel, Wolfenbuettel (DE); Wilfried Groote, Vellmar (DE); Frank Greizer, Kaufungen (DE); Ralf Joachim Laschinski, Kassel (DE); Matthias Victor, Niestetal (DE); Torben Westphal, Aurich (DE)

(73) Assignee: SMA Solar Technology AG, Niestetal (DE)

(21) Appl. No.: 13/212,811

(22) Filed: Aug. 18, 2011

Related U.S. Patent Documents

Reissue of:
(64) Patent No.: 7,576,449
Issued: Aug. 18, 2009
Appl. No.: 11/650,781
Filed: Jan. 8, 2007

(30) Foreign Application Priority Data

Jan. 27, 2006 (DE) ..... 10 2006 003 904

(51) Int. Cl.

| | |
|---|---|
| ***H02J 1/12*** | (2006.01) |
| ***H02J 3/00*** | (2006.01) |
| ***H02J 5/00*** | (2006.01) |
| ***H03K 19/00*** | (2006.01) |
| ***H02J 3/38*** | (2006.01) |
| ***H02J 7/34*** | (2006.01) |
| ***H02J 1/00*** | (2006.01) |
| ***G05D 17/00*** | (2006.01) |
| *G05D 3/12* | (2006.01) |
| *G05D 5/00* | (2006.01) |
| *G05D 9/00* | (2006.01) |
| *G05D 11/00* | (2006.01) |

(52) U.S. Cl.
USPC ..... 307/45; 700/286; 700/292; 700/293; 307/44; 307/82

(58) Field of Classification Search
USPC ..... 361/45; 307/45–46
See application file for complete search history.

(56) References Cited

U.S. PATENT DOCUMENTS

| | | | | |
|---|---|---|---|---|
| 6,963,147 | B2 * | 11/2005 | Kurokami et al. | 307/154 |
| 2006/0083039 | A1 * | 4/2006 | Oliveira et al. | 363/131 |

FOREIGN PATENT DOCUMENTS

| | | |
|---|---|---|
| EP | 0 817 350 | 1/1998 |
| JP | 05 308780 | 11/1993 |
| WO | 2005/117136 | 12/2005 |
| WO | 2006/084294 | 8/2006 |

* cited by examiner

*Primary Examiner* — Dharti Patel
(74) *Attorney, Agent, or Firm* — Slater & Matsil, L.L.P.

(57) ABSTRACT

A method of converting a direct voltage generated by a decentralized power supply system into three-phase alternating voltage by means of a plurality of single-phase inverters (WR1-WR3), said alternating voltage being provided for supplying an electric mains, is intended to avoid inadmissible load unbalances using single-phase inverters. This is achieved in that, upon failure of one inverter (WR1-WR3), an asymmetrical power supply distribution is reduced by limiting the output of the other inverters. The method makes it possible to simplify three-phase voltage monitoring.

30 Claims, 4 Drawing Sheets

METHOD FOR CONVERTING DIRECT VOLTAGE INTO THREE PHASE ALTERNATING VOLTAGE

Matter enclosed in heavy brackets [ ] appears in the original patent but forms no part of this reissue specification; matter printed in italics indicates the additions made by reissue.

CROSS-REFERENCE TO RELATED APPLICATIONS

This application claims Priority from German Application No. DE 10 2006 003 904.1-32 filed on 27 Jan. 2006

FIELD OF THE INVENTION

The invention relates to a method having the features recited in the preamble of claim 1.

DESCRIPTION OF THE PRIOR ART

Mains connected systems for decentralized energy supply, e.g., photovoltaic systems with solar modules and inverters or systems with fuel cells and inverters are known. For low output, a single-phase inverter is usually used for single-phase power supply; for high output, the power supply is three-phased. However, the use of a three-phase inverter is expensive, since it has less efficiency and is produced in smaller quantities.

This is the reason why, for high output, one usually uses three single-phase inverters. However, it suffices a failure of but one of the inverters, as a result of a short for example, to often cause asymmetrical power supply exceeding the admissible limit or a load unbalance to occur as a result of the independent supply.

BRIEF SUMMARY OF THE INVENTION

It is the object of the invention to indicate a method that avoids inadmissible load unbalances using single-phase inverters.

This object is solved with the characterizing features of claim 1 in connection with the features recited in the preamble thereof as well as with the characterizing features of claim 9 in connection with the features of the preamble thereof.

The invention relies on the idea consisting in limiting asymmetrical power supply to an admissible limit and not to switch off the entire system so that the intact inverters are capable of proceeding with feeding in the associated phases. In not shutting down the entire system, the quality of current supply or the current availability increases. This means that, in accordance with the invention, the power of the other two inverters is initiated to an imposed value when only one of the inverter fails, for what reason so ever, e.g., as a result of a short circuit. This value may be greater than or equal to zero.

The invention allows for improving the quality of the electric mains while tolerating an admissible load unbalance, with single-phase inverters permitting to achieve high efficiency, modularity and low-cost manufacturing.

In an advantageous developed implementation of the method of the invention, there is provided that the power of every inverter be limited durably to 2-20 kVA, more specifically to about 4.6 kVA. There is preferably provided that the performance of every inverter be limited temporarily, more specifically for about 10 minutes, to about 5 kVA. This measure is particularly suited for mains connected systems for the decentralized energy supply with inverters having a higher rated output, more specifically having an output greater than 4.6 kVA.

It is advantageous if the failure of the inverter is detected by a measurement signal of an additional circuit of the inverter, a power limiting communication signal resulting from the measurement signal being provided. The measurement signal simply detects the failure of one inverter, with such an additional circuit being housed in an additional mounting plate on each of the inverters. This allows for utilizing commercially available single-phase inverters that only need little conversion to implement the method of the invention.

In order to limit the power of the inverters, there is practically provided that the communication signal is communicated to the processors of the inverters in order to limit the power of the inverters by controlling the processors. The processor or microprocessor in each of the intact phases receives a command to limit the power and the inverter may produce the power needed through a corresponding PWM control for example.

Another advantageous measure is characterized in that the measurement signal is produced by a current from a constant current source, said current of said constant current source being in the milliampere range. Through the low measurement current that may preferably be produced in each additional mounting plate, it is possible to put into practice the detection of the failure, using little additional power or rather with high efficiency. It is particularly advantageous if, upon failure of the inverter, the fault is communicated through one or a plurality of external cables between the inverters. As a result, the independent single-phase inverters may practically communicate together so that the status of an inverter is recognized. In case of failure of one or a plurality of inverters, the inventive power limitation of the other inverters is realized.

Other advantageous developed implementations of the invention will become apparent from the dependent claims.

The invention will be better understood upon reading the more detailed description of the Figures, which describes other advantages thereof.

In said Figures:

DETAILED DESCRIPTION OF THE INVENTION

Figure 1:
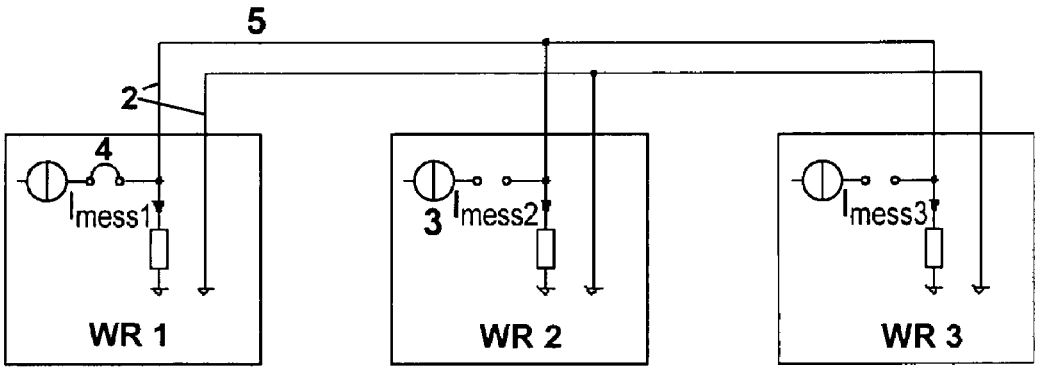
FIG. 1 shows an exemplary embodiment of a circuit arrangement of the invention for limiting a load unbalance.

FIG. 1 shows an example with three single-phase inverters WR1, WR2, WR3, more specifically with photovoltaic inverters, which supply three-phase alternating voltage to a low-voltage main system. As will be shown later, the inverters convert a decentralized direct voltage, produced by solar modules in particular, into a standardized low voltage of 230V/400V/50 Hz for example.

Every inverter WR1-WR3 is provided with a circuit that forms what is referred to as an intertripping or a failure measuring circuit 1. The failure measuring circuit 1 is an additional electronic circuit that connects the three single-phase inverters WR1-WR3 through an external connection 2. Upon failure of one inverter, this failure is communicated between the inverters WR1-WR3 through one or a plurality of external cables 5.

The task of the circuit shown is to detect the failure of an inverter so that, upon asymmetrical power supply resulting from the failure of one inverter, the power of the other inverters may be lowered in order to reduce load unbalance to an admissible limit. In permanent operation, the individual power of the inverters WR1-WR3 is to be limited to 4.6 kVA for example.

Each measuring circuit 1 includes a direct current source 3, more specifically a constant current source. Said source can be connected additionally through an electrically conductive bridge 4 so that only one of the current sources 3 delivers a measurement current, as can be seen in FIG. 1. Further, each measuring circuit includes a connection for a measurement and/or an output signal, which has not been illustrated in greater detail herein. As a result, a failure signal or an OK-signal can be communicated to the other two operative inverters.

It is preferred that every inverter WR1-WR3 be provided with an additional circuit, each inverter having the same additional circuit. The circuit has connections for the direct current source and for the communication lines. One of the current sources delivers the measurement current for measuring the failure, said measurement current being a few mA. In FIG. 1, it is the inverter WR1 that delivers the measurement current. Every inverter however has the possibility of communicating a failure or an OK signal to the other two inverters through the output signal. A clearing signal is only generated if the inverters are ready for supply in all of the three phases. Then, all the inverters communicate an OK signal. The communication may be by radio.

In a circuit arrangement that has not been illustrated in greater detail herein and that is provided in the additional circuit, the failure of the inverter is registered by a measurement signal. A communication signal resulting from said measurement signal regulates the power limitation to a value of 4.6 kVA for example. For the communication signal is communicated to the processors of the inverters in order to limit the power of the inverters by means of processor control or of PWM control for example.

Figure 2:
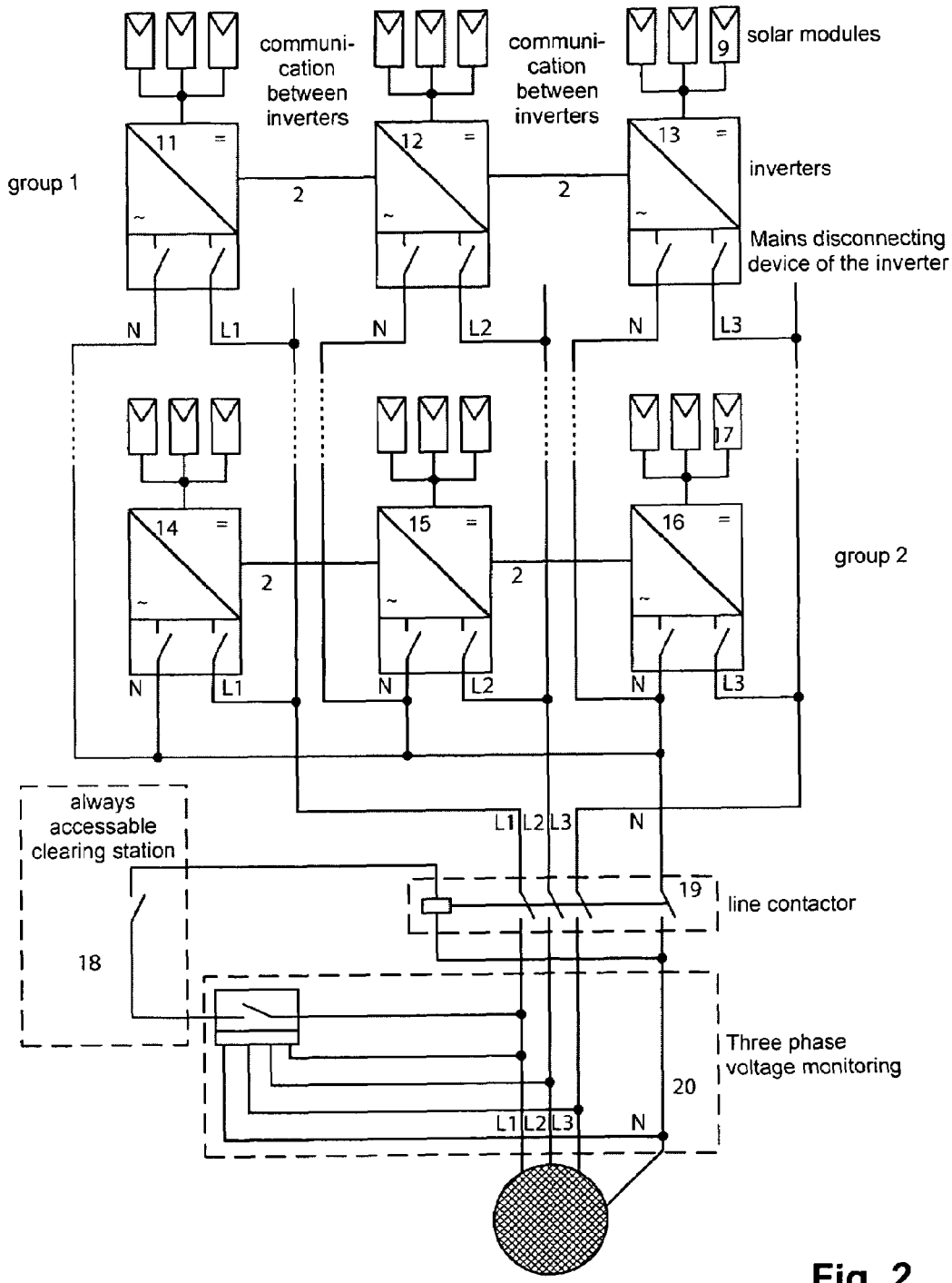
FIG. 2 shows a circuit with two groups of single-phase inverters with a mains contactor and a three-phase voltage monitoring module.

FIG. 2 shows a circuit with two groups GR1, GR2 of single-phase inverters 11-16 that are connected in parallel for increasing the power. The solution in groups is lower in cost since single-phase inverters are manufactured in large quantities and have greater efficiency.

Each inverter 11-16 is supplied, on its input side, with direct voltage generated by solar modules 9. One inverter practically generates alternating current of one phase L1, L2 or L3. Each inverter is moreover provided with an external communication line 2.

For safety reasons, the system shown usually includes a switching center with disconnecting function or clearing means 18 that is accessible to the personnel of the mains operator.

Switching stations may be overground connecting points of a service tap to the supply mains such as a cable connection box, a cable distribution cabinet, a transformer station or a service box, as long as it is unrestrictedly accessible to the personnel of the mains operator.

The clearing means 18 is connected to a contactor 19 in such a manner that said contactor 19 is capable of causing the mains to disconnect through actuation of the clearing means 18. Moreover, the contactor 19 is coupled to a three-phase voltage monitoring module 20 so that an additional network limiter is provided. As shown in FIG. 2, the clearing means 18 is connected to the three-phase voltage monitoring module 20. This module 20 allows for disconnecting all the inverters from the mains when the voltage of one phase exceeds, or falls short of, imposed limit values. Network limitation is further improved as a result thereof.

Preferably, a plurality of groups of three single-phased inverters are connected to the output side of a three-phase protection switchgear (contactor 19), said switchgear being adapted to be switched off through the manual, external clearing means 18 or through a voltage monitoring module 20.

Figure 3:
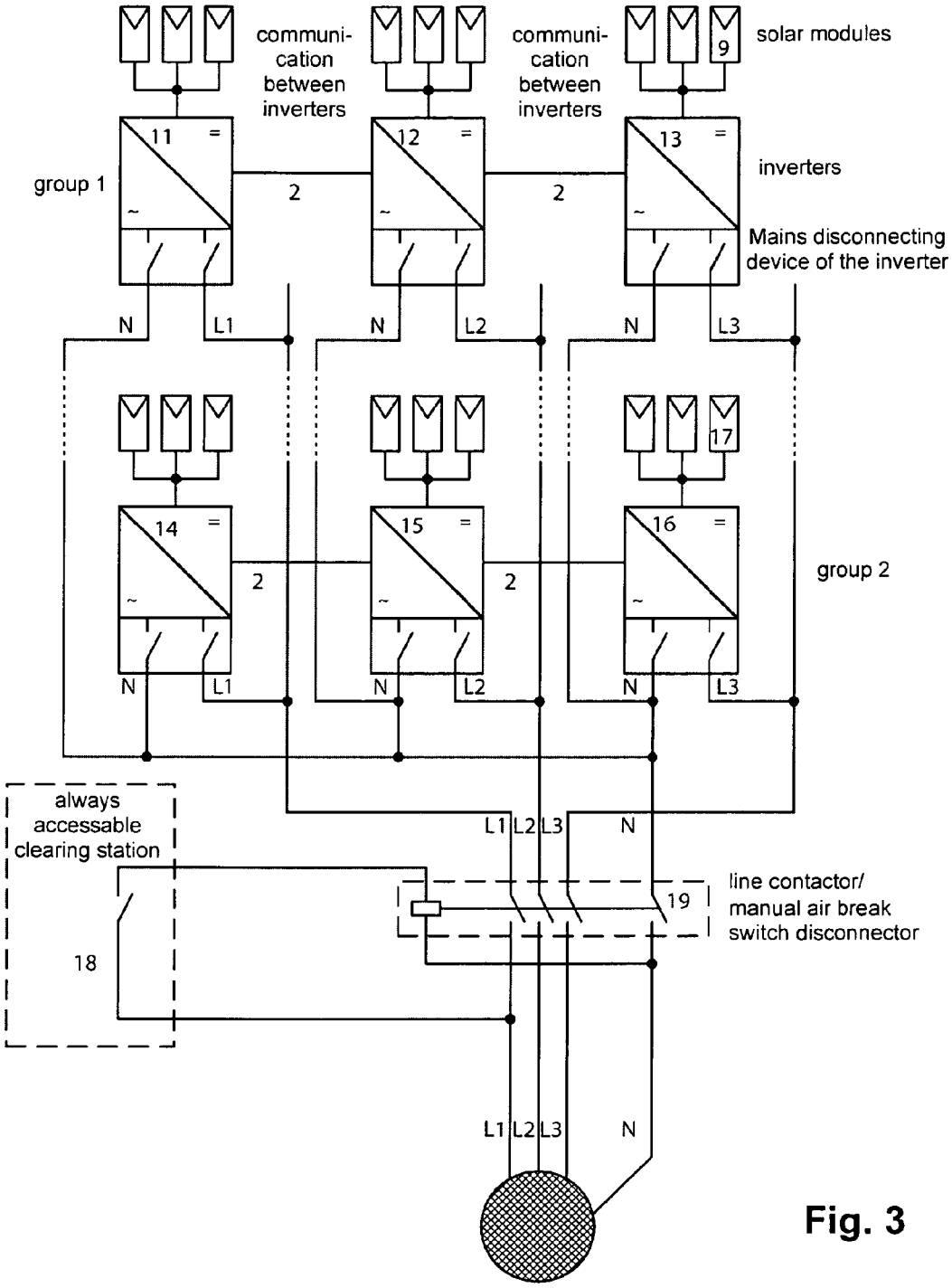
FIG. 3 shows a circuit with two groups of single-phase inverters with a mains contactor without three-phase voltage monitoring module and FIG. 4 shows a circuit with two groups of single-phase inverters, the mains being disconnected directly by the inverters.

In the solution shown in FIG. 3, one has made the economy of the module 20 so that the installation expense is reduced. The contactor 19 however is still connected to the clearing means 18.

Figure 4:
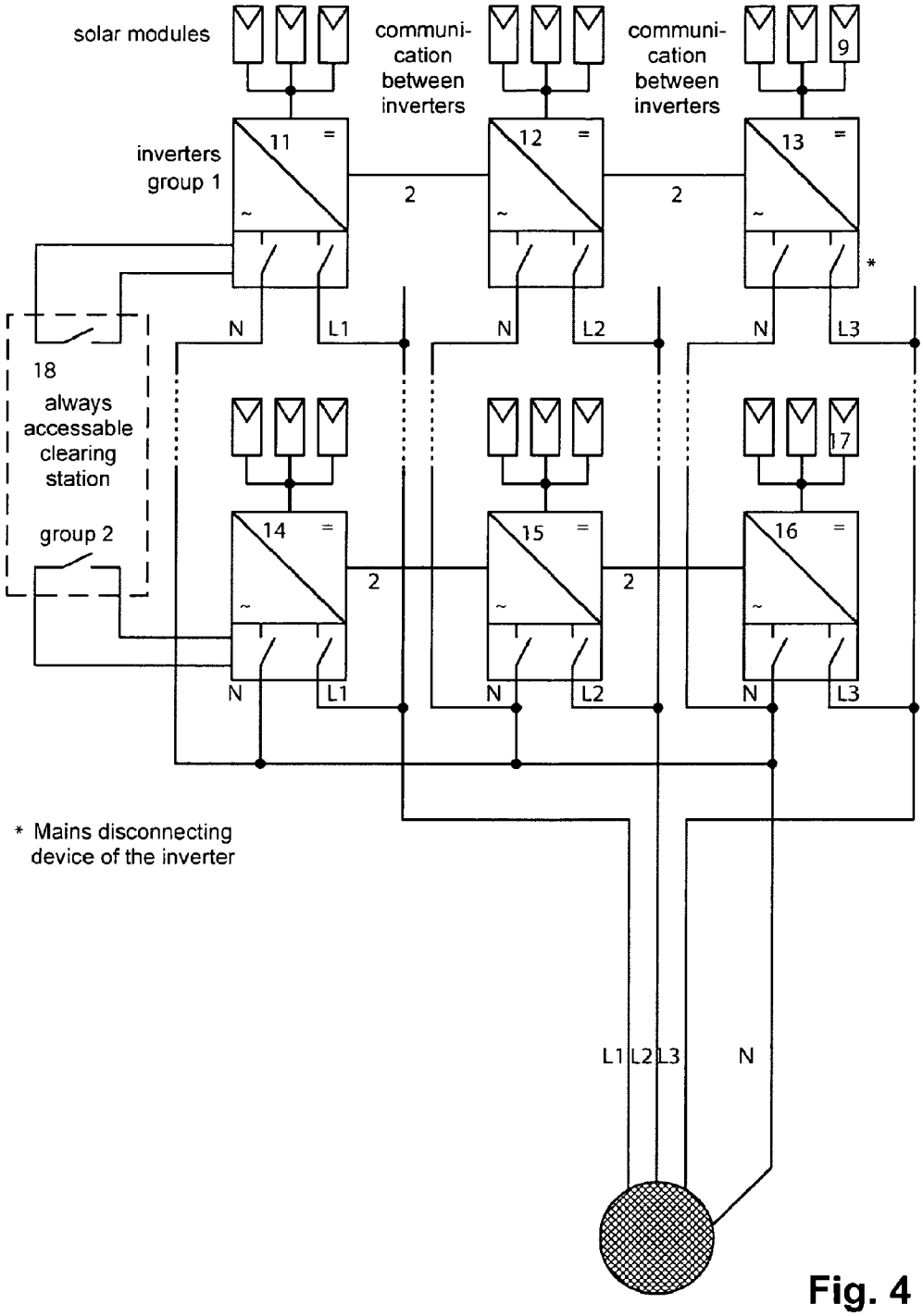

As shown in FIG. 4, the failure circuit may further be implemented in such a manner that a signal occurs from outside, for example by actuation of the clearing means 18, said signal causing the inverters 11-16 to become disconnected from the mains. This can obviate the need for the contactor 19, an air break switch disconnector or another switchgear.

Accordingly, the devices shown for monitoring the mains are provided with a respective associated switching member or with a clearing station. With single-phase power supply through one of the inverters 11-16 to the mains supply system, such a device is utilized up to a rated output 4.6 kVA, in a three-phased implementation, up to an output of 30 kVA for PV inverters (PV=photovoltaic). It may be integrated into the PV inverter or implemented as an independent protective device. In addition thereto, the device may include a voltage and frequency monitoring device and may evaluate as an additional criterion located mains impedance leaps of a certain order of magnitude. Thanks to these criteria, namely the redundant implementation of the switching members and the self-monitoring of the measurement system, the device is capable of meeting safety demands so that the required switching center with disconnection function, which has to be always accessible to the personnel of the mains operator, and the separate voltage and frequency monitoring device otherwise provided for preventing decoupling can be simplified.

For PV-systems with rated outputs >30 kVA, both an always accessible clearing station and a three-phase voltage monitoring device are needed. On systems with inverters, this is preferably realized in the following manner:

The system may be disconnected by the contactor 19 in the main line, which connects the system to the mains connecting point. As shown, groups of inverters are thereby formed in larger systems. Each of these groups can be disconnected from the mains by its own contactor. Savings can thus be made since a high-capacity contactor is more expensive than a plurality of contactors having a lower switching capacity. Motor-driven switches are also possible as switchgears for protecting the mains.

A separate voltage monitoring relay (module 20 and contactor 19) measuring the voltages in the three phases of the mains connection may act onto the protector as shown in FIG. 2. If one voltage leaves the adjusted range, the voltage monitoring relay opens the contactor 19.

In order to implement the always accessible clearing station a turn knob snap switch, which also acts onto the mains disconnecting contactor 19, can be housed on the outside of a house, for example in a lockable box.

If an inverter for single-phase power supply has a three-phase mains monitoring device, the voltage monitoring module 20 can be obviated. If three inverters for single-phase power supply are distributed over three mains phases and are connected together using an intertripping or a failure circuit 1 for the other two inverters to also switch off upon failure of one inverter, this corresponds to a three-phase voltage monitoring. In this case, the voltage monitoring relay according to FIG. 2 can be obviated.

The possibility of disconnecting the inverters 11-16 from the mains through a contact from the outside is, in terms of construction, easy to combine with the intertripping illustrated in FIG. 2; therefore the current source 3 of the intertripping (see $I_{mess}$ 1 in FIG. 2) can be practically switched on and off through an external switch. The costs incurred by this additional function are minimal. In this case, the main disconnecting contactor 19 can be obviated.

In the Figures, there has been described a method of converting a direct voltage generated by a photovoltaic system into a three-phase alternating current by means of a plurality of single-phase inverters, the alternating current being provided for being supplied to an electric mains supply. In accordance with the invention, upon failure of one inverter, an asymmetrical power distribution of the mains electricity supply is reduced by limiting the output of the other inverters.

We claim:

1. A method of converting direct voltage generated by a mains connected system for decentralized power supply into a three-phase alternating voltage by means of a plurality of single-phase inverters [(WR1-WR3)] connected to a different phase (L1, L2, L3), said alternating voltage being provided for supplying [an electric] *the* mains and for decentralized power supply, [whereby] *wherein* upon failure of one inverter [(WR1-WR3)] *of the plurality of inverters*, an asymmetrical power supply distribution is reduced by limiting [the] output of the other inverters *of the plurality of inverters*, [whereby] *wherein* the failure of the *one* inverter [(WR1-WR3)] is registered by a measurement signal of an additional circuit of *each of* the [inverter] *other inverters*, a communication signal resulting from the measurement signal being provided for limiting the output or for disconnecting the *other* inverters from the mains, [whereby] *wherein* the measurement signal is generated by a current of a constant current source, said current of said constant current source being in [the] *a* milliampere range.

2. The method as set forth in claim 1, [whereby that] *wherein* the output of each [inverter (WR1-WR3)] *of the other inverters* is durably limited to 2-20 kVA[, more specifically to about 4.6 kVA].

3. The method as set forth in claim 1, [whereby] *wherein* the output of each [inverter (WR1-WR3)] *of the other inverters* is limited temporarily[, more specifically for about 10 minutes,] to about 5 kVA.

4. The method as set forth in claim 1, [whereby] *wherein* the communication signal is communicated to [the] processors of *each of* the *other* inverters [(WR1-WR3)] for limiting the output of *each of* the *other* inverters by means of processor control.

5. The method as set forth in claim 1, [whereby the] *wherein a* communication takes place between the *plurality of* inverters [(WR1-WR3)], through which each inverter communicates through one or a plurality of external cables [that it is ready for supply].

6. The method as set forth in claim 1, [whereby the] *wherein a* communication takes place between the *plurality of* inverters [(WR1-WR3)], each inverter communicating by radio [that it is ready for supply].

7. A circuit arrangement comprising means for implementing the method as set forth in claim 1, with a plurality of single-phase inverters [(WR1-WR3)] of a decentralized power supply system, wherein each inverter has a failure measuring circuit [(1)] for reducing the power of the [other inverters] *inverter* upon *an* asymmetrical power supply resulting from the failure of *one of* the [inverter] *inverters*.

8. The circuit arrangement as set forth in claim 7, [whereby] *wherein* each measuring circuit includes a direct current source [(3), more specifically a constant current source, that may be additionally] *but only one constant current source is* connected through an electrically conductive bridge [(4), so that only one of the current sources (3) delivers the] *in order to deliver a* measurement current, each measuring circuit comprising a connection for a measurement and/or output signal in such a manner that a failure or an OK signal can be communicated [to the other two inverters].

9. The circuit arrangement as set forth in claim 7, [whereby] *wherein* each inverter is implemented with an external communication line [(2)].

10. The circuit arrangement as set forth in claim 7, [whereby] *wherein* a plurality of groups [(GR1, GR2)] of three single-phase inverters [(11-16)] is connected to [the] *an* output side of a three-phase protection switchgear, said switchgear being adapted to be switched off through [the] *a* manual, external clearing means [(18)].

11. The circuit arrangement as set forth in claim 10, [whereby] *wherein* the switchgear is a contactor [(19)].

12. The circuit arrangement as set forth in claim 7, [whereby an implementation such that] *wherein*, upon failure of *the* one [inverter] *of the inverters*, all the inverters are disconnected from the mains when the voltage of one phase exceeds, or falls short of, imposed limit values.

13. The circuit arrangement as set forth in claim [12 whereby an implementation such that] *10 wherein all* the inverters are disconnected from the mains by directly switching them off, a manual, external clearing means [(18)] being directly connected to [all] the [inverter] *plurality of* groups.

*14. A method comprising:*

*applying a measurement current in a milliampere range from a constant current source to an inverter system comprising a first single phase inverter, a second single phase inverter and a third single phase inverter;*

*monitoring the inverter system through a first circuit in the first single phase inverter;*

*monitoring the inverter system through a second circuit in the second single phase inverter;*

*monitoring the inverter system through a third circuit in the third single phase inverter;*

*upon a failure of the third single phase inverter, measuring the failure in the first single phase inverter and the second single phase inverter;*

*reducing a first output power of the first single phase inverter based on the measured failure in the first single phase inverter; and*

*reducing a second output power of the second single phase inverter based on the measured failure in the second single phase inverter*

*thereby reducing an asymmetrical power supply.*

*15. The method according to claim 14, wherein measuring the failure comprises communicating a first communication signal to a first processor of the first single phase inverter and communicating a second communication signal to a second processor of the second single phase inverter.*

*16. The method according to claim 14, wherein reducing the first output power and the second output power comprises limiting the first output power and the second output power to 2 kVA-20 kVA, respectively.*

*17. A method of converting a direct voltage into a three phase alternating voltage for supplying into a mains, each single phase inverter of a plurality of single phase inverters having a different phase, the method comprising:*

*monitoring a plurality of single phase inverters by measuring a constant current in a milliampere range at a circuit of each single phase inverter;*

*upon measuring a failure of one of the single phase inverters, communicating the failure to a processor of each of the other single phase inverters; and*

*reducing an asymmetrical power supply by limiting an output power of each of the other single phase inverters.*

*18. The method according to claim 17, wherein reducing the output power comprises limiting the output power to 2 kVA-20 kVA, respectively.*

*19. A method comprising:*

*monitoring an operating condition of a first single phase inverter, a second single phase inverter and a third single phase inverter by measuring a constant current in a milliampere range;*

*upon measuring a failure of the first single phase inverter in circuits of the second single phase inverter and the third single phase inverter; and*

*reducing an asymmetrical power supply by reducing output powers of the second single phase inverter and the third single phase inverter by communicating to processors of the second single phase inverter and the third single phase inverter the failure of the first single phase inverter.*

*20. The method according to claim 19, wherein reducing the output power comprises limiting the output power to 2 kVA-20 kVA.*

*21. A system comprising:*

*a plurality of single-phase inverters, each single phase inverter configured to provide a different single phase and each single-phase inverter comprising*

*a monitoring circuit configured to measure a constant current in a milliampere range; and*

*a controller configured to control a power output of the respective single phase inverter; and*

*a connection connecting the monitoring circuits of the plurality of the single phase inverters,*

*wherein upon a failure of one of the single phase inverters, the monitoring circuits of the other single phase inverters send a communication signal to their respective controllers, and*

*wherein the controllers of the other single-phase inverters reduce the power outputs of the other single-phase inverters to reduce an asymmetrical power supply.*

*22. The system according to claim 21, wherein the power outputs of the other single-phase inverters are limited to 2 kVA-20 kVA.*

*23. The system according to claim 21, further comprising a communication circuit having one or a plurality of external cables.*

*24. The system according to claim 21, further comprising a wireless communication circuit.*

*25. A system comprising:*

*a first single phase inverter configured to produce a first single phase, the first single phase inverter comprising*

*a first monitoring circuit;*

*a first constant current source configured to provide a current in a milliampere range; and*

*a first controller configured to control a first power output of the first single phase inverter;*

*a second single phase inverter configured to produce a second single phase, the second single phase inverter comprising*

*a second monitoring circuit; and*

*a second controller configured to control a second power output of the second single phase inverter;*

*a third single phase inverter configured to produce a third single phase, wherein the first, second and third single phase are different; and*

*a connection connecting the first single-phase inverter, the second single-phase inverter and the third single phase inverter,*

*wherein the monitoring circuit of the first single phase inverter is configured to send, upon detection of a failure of the third single phase inverter, a first communication signal to the controller of the first single phase inverter,*

*wherein the monitoring circuit of the second single phase inverter is configured to send, upon detection of the failure of the third single phase inverter, a second communication signal to the controller of the second single phase inverter,*

*wherein the first single phase inverter reduces a first output power,*

*wherein the second single phase inverter reduces a second output power, and*

*wherein an asymmetrical power supply is reduced.*

*26. The system according to claim 25, wherein the first output power comprises 2 kVA-20 kVA, and wherein the second output power comprises 2 kVA-20 kVA.*

*27. The system according to claim 25, wherein the first output power comprises about 4.6 kVA, and wherein the second output power comprises about 4.6 kVA.*

*28. The system according to claim 25, further comprising a communication circuit comprises one or a plurality of external cables.*

*29. The system according to claim 25, further comprising a wireless communication circuit.*

*30. The system according to claim 25, wherein the first single phase inverter comprises a conductive bridge between the constant current source and the monitoring circuit.*

* * * * *